Oct. 19, 1926.
S. E. ALLEY
1,603,441
SELF PROPELLED VEHICLE
Filed Nov. 21, 1925     3 Sheets-Sheet 1
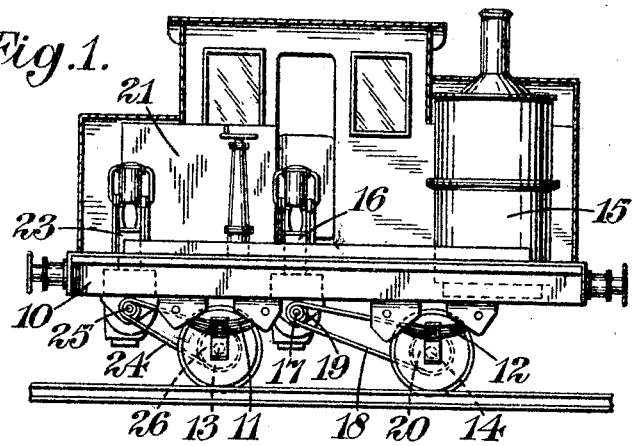
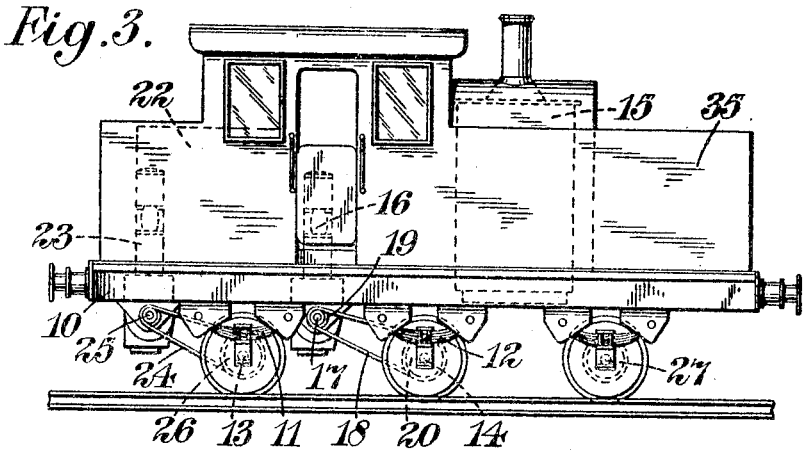
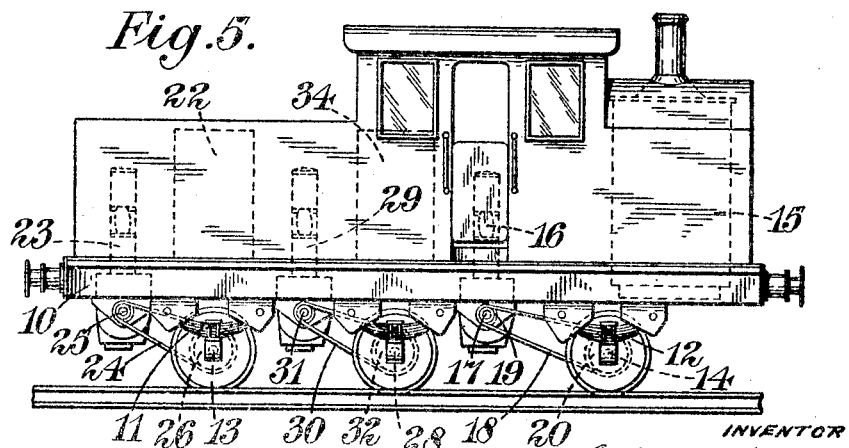

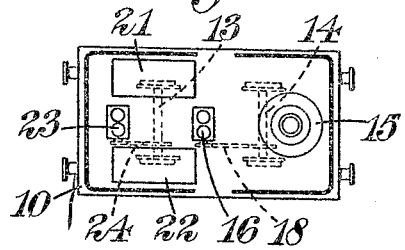
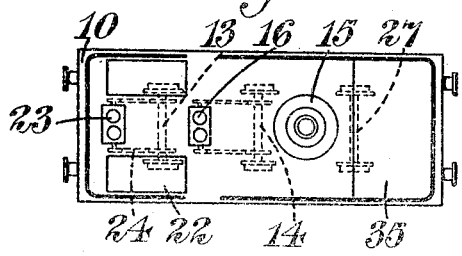
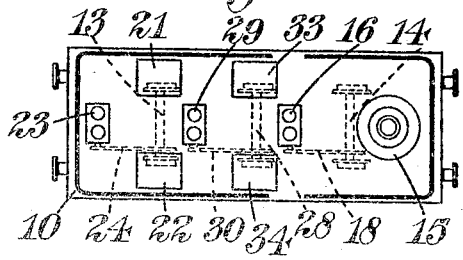
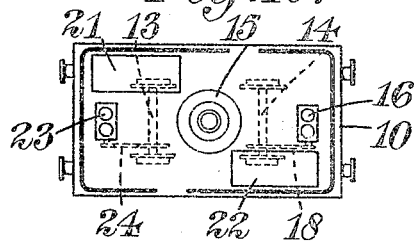
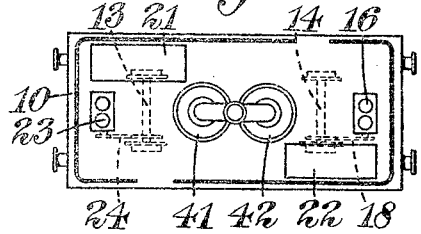
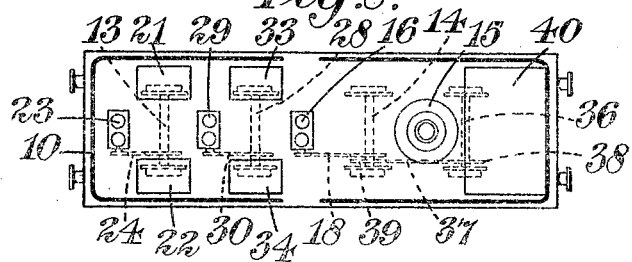

Oct. 19, 1926. 1,603,441
S. E. ALLEY
SELF PROPELLED VEHICLE
Filed Nov. 21, 1925 3 Sheets-Sheet 3
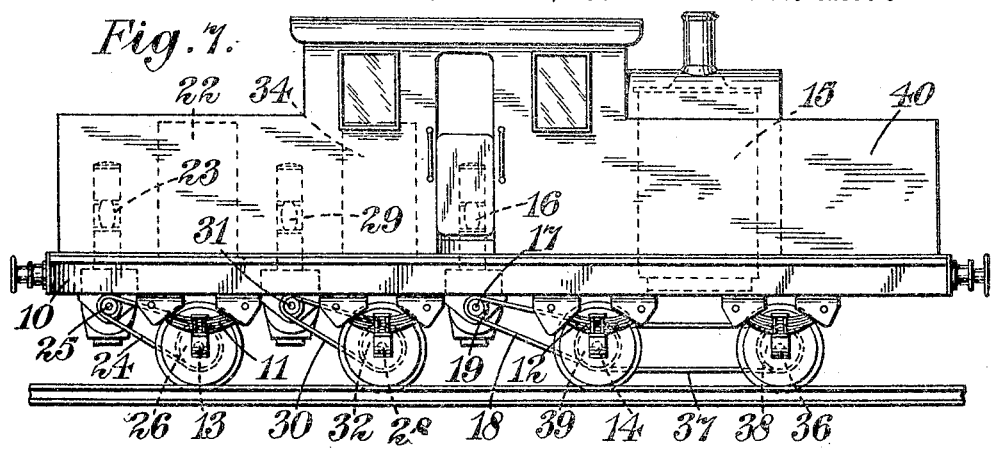
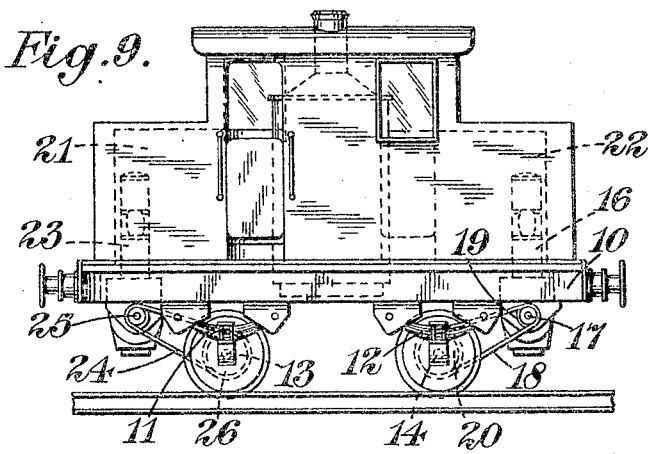
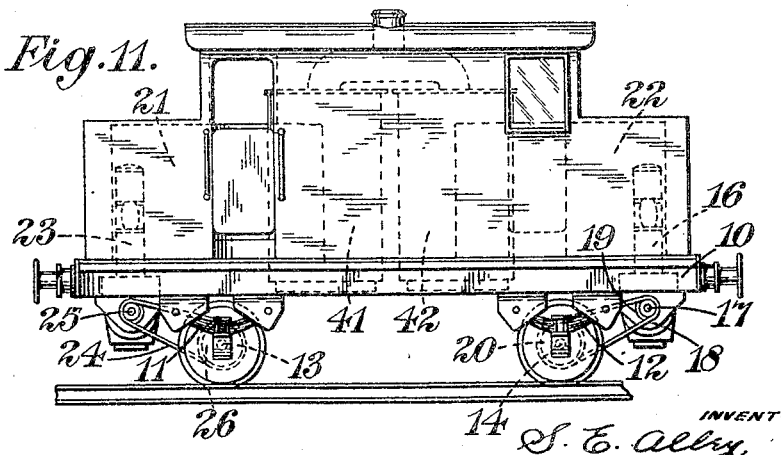

Patented Oct. 19, 1926.

1,603,441

UNITED STATES PATENT OFFICE.

STEPHEN EVANS ALLEY, OF LONDON, ENGLAND, ASSIGNOR TO THE "SENTINEL" WAGGON WORKS LIMITED, OF LONDON, ENGLAND, A BRITISH COMPANY.

SELF-PROPELLED VEHICLE.

Application filed November 21, 1925, Serial No 70,578, and in Great Britain December 10, 1924.

This invention is for improvements in or relating to self-propelled vehicles and has for one of its objects to improve the driving gear and promote flexible working. The invention is particularly applicable to chain driven railway locomotives and tractor units for railway coaches, but it is immaterial what type of motor unit is employed, though the invention is particularly applicable to steam-propelled vehicles.

According to the primary feature of the present invention there is provided a self-propelled vehicle having in combination two or more separately driven engine crankshafts, a running wheel axle distinct from and separately appropriated to each crankshaft, and transmission gear coupling each crankshaft to its appropriated axle or to one or more running wheels thereon. There may be a standard engine unit employed of which two or more are fitted to the vehicle chassis as desired. This will promote simplicity, while by having a running wheel axle appropriated to each engine unit and by providing suitable controls and connections, flexibility of working is secured since for starting, or during other periods of heavy load, more or different engines may be employed to drive their appropriated axles or wheels thereon, than at other times when the load is lighter.

The engine cylinder or cylinders are preferably arranged to be vertical, or substantially out of the horizontal, and according to another feature of the invention, the said engine crankshafts, or countershafts co-operating therewith, lie parallel to the said running wheel axles to which they are appropriated and are so situated relatively thereto that a plane containing each pair of axes is horizontal or approaches the horizontal, and flexible transmission means are provided between each crankshaft or its co-operating countershaft and the appropriate axle or running wheel or wheels thereon. This general arrangement of the parts is on the lines described and illustrated in United States Letters Patent No. 1,564,505 dated December 8, 1925, but the locomotive described in that specification has only a single engine. This arrangement not only avoids the transmission vertically or substantially so of thrust from the crankshafts to the axles but it also accommodates movement of the latter relatively to the crankshafts due to the body of the vehicle being spring supported from the axles and to road shocks being experienced.

The transmission gear, which will usually include chains and chain sprockets and which may provide a speed variation, may be arranged to couple both ends of each crankshaft to its appropriated axle or running wheels, and where the drive is to both ends of a rotary axle, various means for equalizing or partially equalizing the driving stresses on the two ends of the axle may be employed.

The invention is capable of application to vehicles having more than two running wheel axles, and it will be understood that there may be coupled to the driven axle or running wheels specified above, one or more further running wheel axles or running wheels on one or more axles.

The vehicle may have one or more boilers as desired; for instance each engine unit may be fed from its own boiler, or there may be provision for each boiler of a plurality to feed several engine units, the controlling means being such as to permit of the supply arrangements being varied according to circumstances. Where more than two engine units are employed, it may be desirable to articulate the vehicle so as to facilitate rounding curves.

For a more complete understanding of the invention there will now be described, by way of example only and with reference to the accompanying drawings, certain constructional forms of railway locomotives according to the invention. It is to be understood, however, that the invention is not restricted to the precise constructional details set forth.

In these drawings—

Figure 1 is a sectional side elevation of a railway locomotive with two engines and two running wheel axles;

Figure 2 is a plan of the construction shown in Figure 1, but on a scale smaller than that of Figure 1;

Figure 3 is a side elevation of a locomotive with two engines and three running wheel axles;

Figure 4 is a plan of the construction shown in Figure 3, but on a scale smaller than that of Figure 3;

Figure 5 is a side elevation of a locomotive with three engines and three running wheel axles;

Figure 6 is a plan of the construction shown in Figure 5 but on a scale smaller than that of Figure 5;

Figure 7 is a side elevation of a locomotive with three engines and four running wheel axles;

Figure 8 is a plan of the construction shown in Figure 7, but on a scale smaller than that of Figure 7;

Figure 9 is a side elevation of a locomotive with the same number of engines and running wheel axles as in the construction shown in Figure 1, but the parts are differently arranged.

Figure 10 is a plan of the construction shown in Figure 9, but on a scale smaller than that of Figure 9.

Figure 11 is a side elevation of a locomotive also somewhat similar to that shown in Figure 1, but embodying two boilers, and Figure 12 is a plan of the construction shown in Figure 11, but on a scale smaller than that of Figure 11.

Like reference numerals indicate like parts throughout the drawings.

It will be appreciated that the arrangement of the engine units and boilers on the chassis, and the driving connections to the axles or running wheels may be varied in many ways. The drawings show a number of ways, but it will be appreciated that the invention embraces many other similar layouts.

In the construction shown in Figures 1 and 2 a rigid chassis or framework 10 is supported by springs 11 and 12 from two running wheel axles 13 and 14. Forwardly situated relatively to the front axle 14 is a vertical boiler 15 in such a position that its bottom fittings are exposed and freely accessible and can be detached and lowered beyond the said running wheel axle. Between the axles 13 and 14 there is mounted on the chassis 10 a vertical engine 16 having its crankshaft 17 at its lower end and substantially in the same horizontal plane as the front axle 14 to which it is connected by a chain 18 and sprocket wheels 19 and 20. Over or substantially over the rear axle 13 are fuel and water bunkers 21 and 22, and to the rear of the rear axle is another vertical engine 23 arranged like the engine 16 and connected to the rear axle by a chain 24 and sprocket wheels 25 and 26.

In the construction shown in Figures 3 and 4, the arrangement is substantially the same as that of Figures 1 and 2 save that in Figures 3 and 4 a third running wheel axle 27 is shown which is situated forwardly of the boiler 15 and in such a position as not to obstruct the lower end of the latter. Also it will be seen, by reference to Figure 4, that both ends of each crankshaft are connected to the corresponding running wheel axle by chains and sprocket wheels. There is also an additional bunker 35 situated in front of the boiler 15.

The arrangement shown in Figures 5 and 6 is similar to that shown in Figures 1 and 2 save that there is an additional running wheel axle 28 provided which is situated between the axles 13 and 14. For driving this additional axle, the chassis 10 carries a third engine 29 which is connected by a chain 30 and sprocket wheels 31 and 32 to the axle 28. Additional bunkers 33 and 34 are also provided which are situated over the intermediate axle 28.

The construction shown in Figures 7 and 8 follows the lines of that shown in Figures 5 and 6 but there is a fourth running wheel axle 36 which is situated forwardly of the boiler 15 and in such a position as not to obstruct the lower end of the latter. The axle 36 is connected by a chain 37 and sprocket wheels 38 and 39 to the axle 14 to be driven thereby. There is also an additional bunker 40 situated forwardly of the boiler 15.

The locomotive shown in Figures 9 and 10 has its boiler 15 situated between the two axles 13 and 14 in such a position that they do not obstruct its lower end. The engine 16 for driving the axle 14 is situated forwardly thereof, i. e. towards that end of the chassis 10 remote from the end at which the other engine 23 is situated.

In the construction shown in Figures 11 and 12 the arrangement is practially the same as in Figures 9 and 10 save that two boilers 41 and 42 are provided between the two running wheel axles. One may be appropriated to the one engine and the other to the other engine, or both boilers may be arranged to feed one engine, or one boiler may be arranged to feed both engines according to the way in which the controls are set.

The various constructions of locomotive illustrated in the drawings have the engine crankshaft directly connected by a chain or chains to its appropriate running wheel axle or to one or more running wheels thereon. Instead of this arrangement, however, one or more countershafts may be interposed, or other means provided for securing a speed variation between the crankshaft and axle. Although Figure 4 is the only figure showing both ends of a crankshaft connected to the corresponding axle, it will be understood that this arrangement may be adopted in any or all of the other constructions as desired. Where the drive is to both ends of a rotary axle it is preferred to provide means for equalizing or partially equalizing the driving stresses on the two ends of the axle. For instance, a differential gear embodied in the crankshaft as described in United States specification No. 1,498,604 may be employed; or an automatic slipping brake as described in British specification No. 213,993 may be embodied in such a combined differential and crankshaft; or a spring drive of which there can be many forms may be located in the transmission gear at one or both ends of the crankshaft. Where one axle is coupled to another axle, as illustrated for example in Figures 7 and 8, instead of the chain 37 shown, side coupling rods or other equivalent means may be employed.

In all of the constructions it will be seen that the plane containing the crankshaft axis and the appropriated running wheel axle approaches the horizontal or at least is substantially out of the vertical. Smoothness of running and driving will be facilitated thereby since the direct transmission of vertical thrusts from the engine to the running wheels will be avoided and the relative rise and fall of the axles due to running shocks will be accommodated.

It will be understood that the invention is not restricted to the precise constructional details set forth.

I claim:—

1. A self-propelled vehicle comprising in combination a plurality of running wheel axles, running wheels on said axles, a plurality of engine units each comprising a vertical cylinder and a prime mover shaft, said prime mover shafts being distinct from the running wheel axles and the latter being separately appropriated one to each of said shafts, which shafts are arranged at such a level that lines joining their axes to the axes of the appropriated running wheel axles approach the horizontal, and flexible transmission means coupling each prime mover shaft to drive its appropriated set of running wheels.

2. A self-propelled vehicle comprising in combination a plurality of running wheel axles, running wheels on said axles, a plurality of engine units each comprising a vertical cylinder and a prime mover shaft, said prime mover shafts being distinct from the running wheel axles and the latter being separately appropriated one to each of said shafts, which shafts are arranged at such a level that lines joining their axes to the axes of the appropriated running wheel axles approach the horizontal, a chain wheel on each of said prime mover shafts, other chain wheels mounted to rotate with the running wheels and chains connecting each prime mover shaft to drive its appropriated set of running wheels.

3. A self-propelled vehicle comprising in combination a plurality of running wheel axles, running wheels on said axles, a plurality of engine units each comprising a steam boiler, a cylinder and a crankshaft with the cylinder in the unit substantially out of the horizontal, said crankshafts being distinct from the running wheel axles and the latter being separately appropriated one to each of the crankshafts, and transmission gear coupling each crankshaft to drive its appropriated set of running wheels.

In testimony whereof I affix my signature.

STEPHEN EVANS ALLEY.